United States Patent [19]

Prophet

[11] Patent Number: 5,413,743
[45] Date of Patent: May 9, 1995

[54] METHOD OF MAKING A LAMP ASSEMBLY

[75] Inventor: Philip A. Prophet, Alexandria, Ind.

[73] Assignee: General Motors Corporation, Detroit, Mich.

[21] Appl. No.: 63,795

[22] Filed: May 20, 1993

[51] Int. Cl.⁶ .............................................. B29D 11/00
[52] U.S. Cl. ........................................ 264/1.7; 264/1.9;
264/2.1; 264/247; 264/255; 264/297.3;
264/310; 264/328.8; 362/61; 425/808
[58] Field of Search ................. 264/1.7, 2.1, 245, 246,
264/247, 310, 328.7, 328.8, 328.11, 1.9, 255,
252, 297.3; 362/61; 425/808

[56] References Cited

U.S. PATENT DOCUMENTS

| | | | |
|---|---|---|---|
| 3,702,750 | 11/1972 | Veneria | 264/245 |
| 3,766,373 | 10/1973 | Hedgewick . | |
| 3,807,920 | 4/1974 | Aoki | 264/245 |
| 4,670,199 | 6/1987 | Montet et al. | 264/328.8 |
| 4,744,741 | 5/1988 | Glover et al. | 264/328.8 |
| 4,812,955 | 3/1989 | Beswick et al. | 362/61 |
| 4,839,629 | 6/1989 | Brown | 362/61 |
| 4,885,121 | 12/1989 | Patel | 264/246 |
| 5,221,538 | 6/1993 | Gasami et al. | 264/328.7 |
| 5,275,764 | 1/1994 | Hettinga | 264/1.7 |

FOREIGN PATENT DOCUMENTS

| | | | |
|---|---|---|---|
| 2607231 | 9/1976 | Germany | 264/247 |
| 59-158231 | 9/1984 | Japan | 264/1.7 |
| 60-90745 | 5/1985 | Japan | 264/1.7 |
| 894106 | 4/1962 | United Kingdom | 264/328.8 |

OTHER PUBLICATIONS

"Technoscope" article, *Modern Plastics*, May 1992, p. 35.

Primary Examiner—Mathieu D. Vargot
Attorney, Agent, or Firm—George A. Grove

[57] ABSTRACT

A lamp assembly having a plastic housing and a plastic lens is molded in a rotary transfer molding machine having upper and lower mateable housing dies and upper and lower mateable lens dies in which the housing and the lens are molded simultaneously. The machine is then indexed so that the upper housing die with the molded housing retained in it is mated with the lower lens die with the molded lens retained in it. These two dies are configured so that an annular seal bead cavity is formed at an interface of the dies. A seal bead is then molded to join the molded housing to the molded lens to provide the lamp assembly. The machine is then indexed again so that the upper housing die with the lamp assembly retained in it is mated with an overlay die and a decorative overlay is molded on the peripheral margin of the lens.

21 Claims, 3 Drawing Sheets

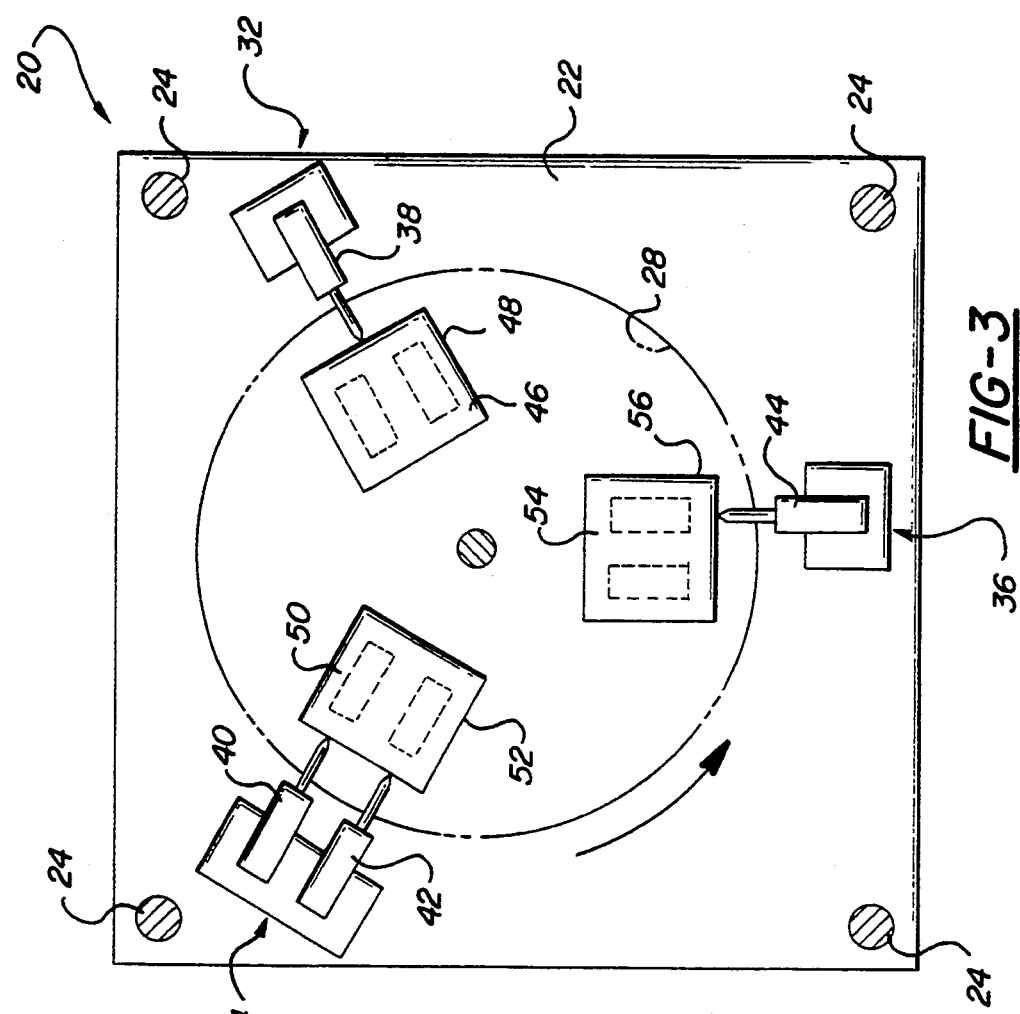
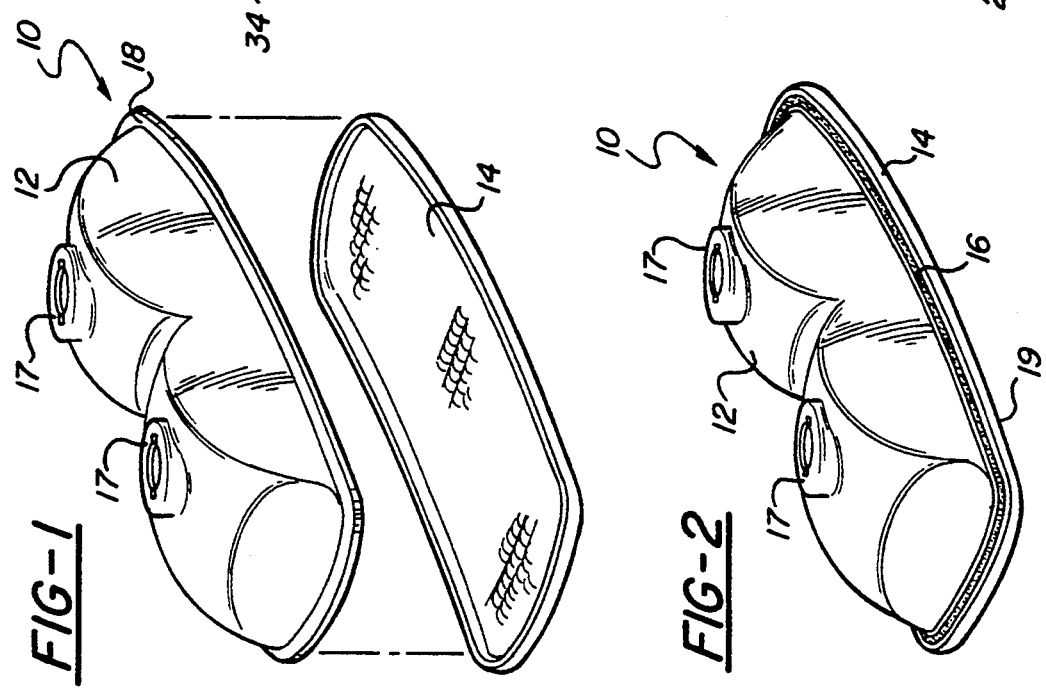

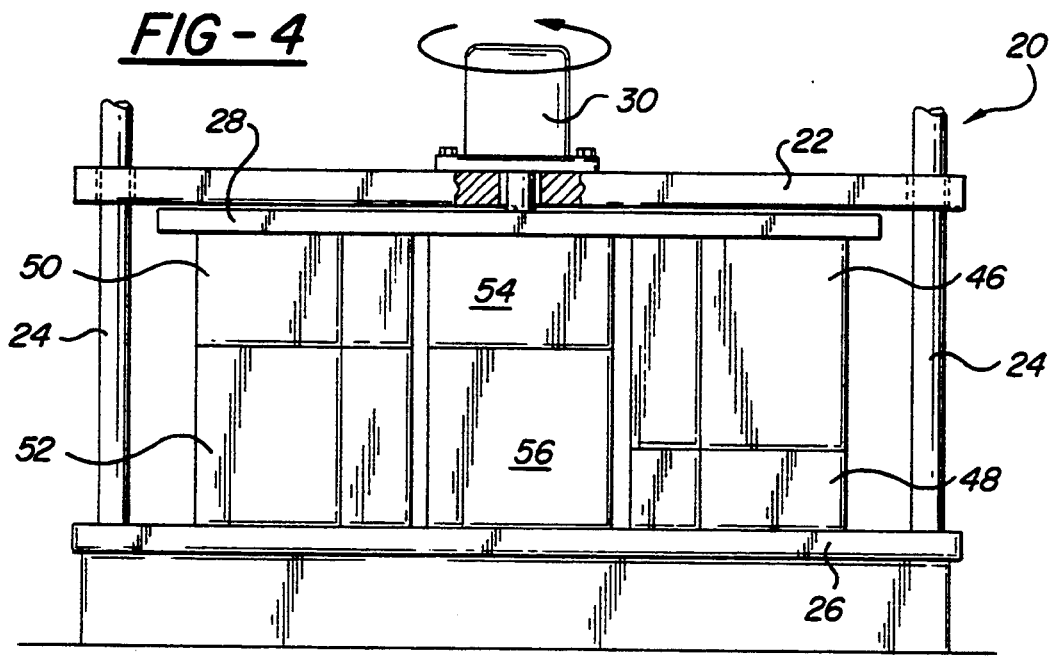
FIG-4
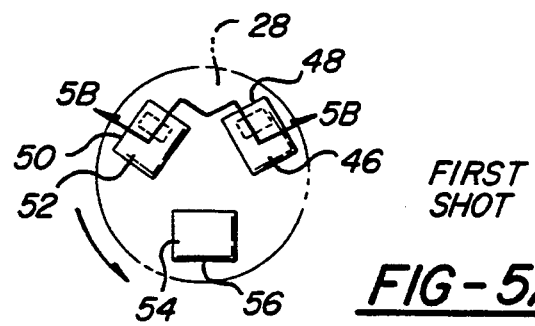
FIG-5A
FIRST SHOT
FIG-5B
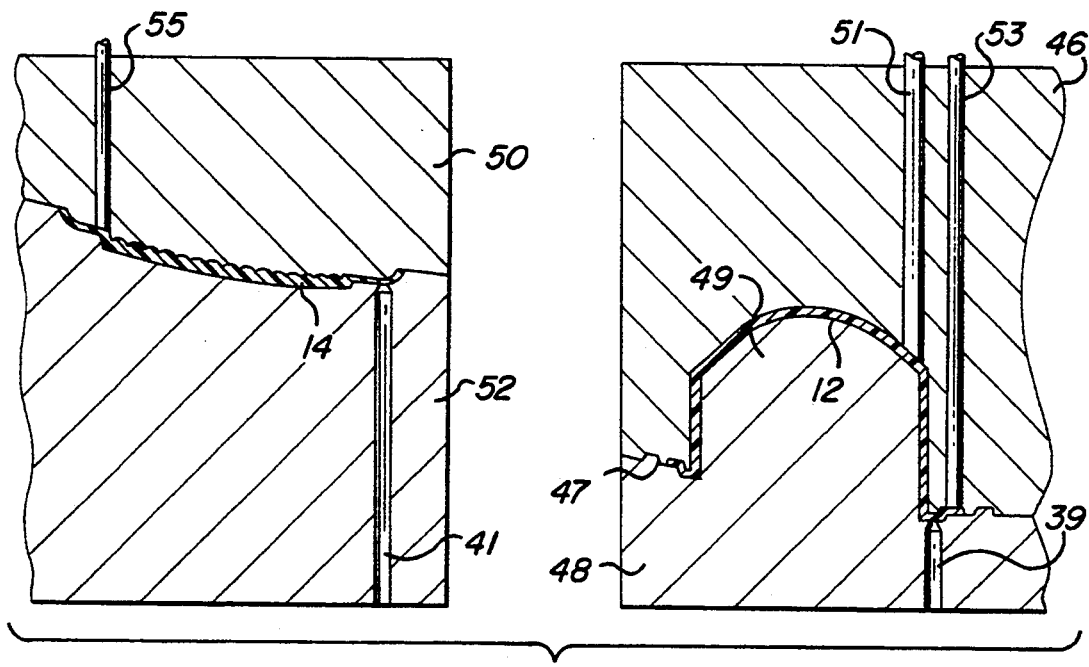

METHOD OF MAKING A LAMP ASSEMBLY

BACKGROUND OF THE INVENTION

This invention relates generally to lamp assemblies and more particularly to lamp assemblies comprising molded plastic housings and molded plastic lenses.

Presently the plastic housings and the plastic lenses are molded in separate molding machines. The molded plastic housings and the molded plastic lenses are then assembled in another machine and secured to each other by various methods. Assembling the molded plastic housings and the molded plastic lenses in a separate machine for securing the housings and lenses together is costly from a manufacturing standpoint because the parts are handled several times. Moreover, this method introduces inaccuracies in the alignment of the lenses and the housings because of dimensional variations between the molding dies and the fixtures of assembly machine.

It is also known that hollow parts can be molded without cores in a die slide injection molding method (DSI) in which two separate halves of the hollow part are injection molded of the same material simultaneously in the same machine. The molded halves are then assembled together in this same machine by re-aligning the die set and injecting the same material to secure the halves of the part to each other. In this known DSI method, each die has a male and a female mold cavity in a linear arrangement. One die is mounted on a moveable platen of the molding machine and the mating die is mounted on the fixed platen. The mating die mounted on the fixed platen includes a slide for realigning the dies for assembly of the separate molded halves of the hollow part. The die set is opened after the separate halves are injection molded and the slide is then actuated to realign the dies so that the female mold cavities containing the molded halves are mated. The realigned dies are then closed and the molded halves are secured to each other by a secondary injection of the same material into the mated female cavities.

This DSI molding method claims to have cost advantages in producing hollow parts. However, this known DSI molding method is not suitable for manufacturing lamp assemblies. For instance, the known DSI method molds two identical halves of the same material and then attaches the two identical halves together with this same material. On the other hand, lamp assemblies require housings and lenses of different colors and preferably of different materials specifically suited to the individual needs of each component. Moreover, the DSI molding method requires expensive tooling because the die set includes a slide for realigning the die set to assemble the molded halves of the part. Because of this slide, the DSI molding method is also not well suited for accurate assembly of components such as required by a lamp assembly comprising housing and lens because accurate alignment must be built into each die set rather than simply relying on the accuracy of the molding machine. The placement of the slide on the fixed platen also requires multiple feed passages through the slide even though the same plastic material is used to mold the two halves of the hollow part and to secure the molded halves together.

SUMMARY OF THE INVENTION

The object of this invention is to provide a lamp assembly that is more economical to manufacture and that has a plastic housing and lens that are secured to each other with a more accurate alignment.

A feature of the invention is that the lamp assembly has a plastic housing and a plastic lens that are molded and secured together in the same machine, thereby eliminating any need for separate assembly machines and operations.

Another feature of the invention is that the same die sets are used to mold the plastic housing and the plastic lens and to secure the plastic housing and the plastic lens together, thereby reducing the manufacturing cost of the lamp assembly.

Another feature of the invention is that the molded plastic housing and the molded plastic lens are retained in their respective dies for assembly, thereby improving alignment accuracy of the molded plastic housing and the molded plastic lens that are secured together to form the lamp assembly.

Still another feature of the invention is that the lamp assembly has a plastic housing and a plastic lens that are molded of different preferred materials simultaneously in the same molding machine.

Still another feature of the invention is that the lamp assembly has a plastic housing and a plastic lens that are molded of different colored materials simultaneously in the same molding machine.

Still another feature of the invention is that the lamp assembly has a plastic housing and a plastic lens that are injection molded in die sets in which the plastic is injected into cavities of the closed die sets via a stationary die mounted on a fixed platen of the molding machine.

Yet another feature of the invention is that the lamp assembly has a plastic housing that is configured with a locking feature to facilitate manufacture of the lamp assembly.

Still yet another feature of the invention is that the lamp assembly has a plastic housing and a plastic lens that are molded in die sets and retained in one of their respective mating dies for assembly, one of the respective mating dies being a stationary die mounted on a fixed platen of the molding machine so that the molded plastic housing and the molded plastic lens are aligned very accurately when they are secured together.

Still yet another feature of the invention is that the lamp assembly has a plastic housing and a plastic lens that may be secured together by a sealant material that is different than the material of both the plastic housing and the plastic lens so that the sealant material may be used to provide a multicolor lens.

Still yet another feature of the invention is that an optional decorative overlay of yet another material may be molded onto the lens.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 1 is an exploded view of a lamp assembly constructed in accordance with the invention;

FIG. 2 is a perspective view of the lamp assembly that is shown in FIG. 1;

FIG. 3 is a top view of a rotary transfer molding machine for constructing the lamp assembly that is shown in FIGS. 1 and 2;

FIG. 4 is a front view of the molding machine that is shown in FIG. 3;

FIG. 5A is a partial top view of the rotary transfer molding machine of FIGS. 3 and 4 showing the turret positioned as shown in FIGS. 3 and 4 for the first molding shot;

FIG. 5B is a section taken substantially along the line 5B—5B of FIG. 5A looking in the direction of the arrows;

DESCRIPTION OF THE INVENTION

Figure 6A:
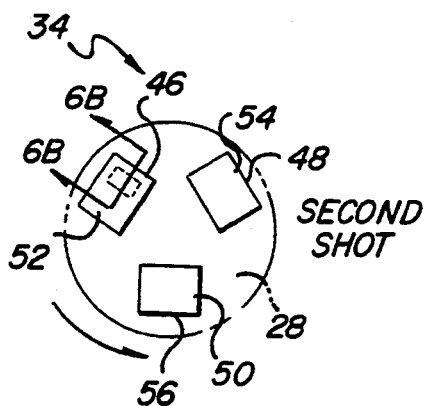
FIG. 6A is a partial top view of the rotary transfer molding machine of FIGS. 3 and 4 showing the turret indexed 120 degrees counterclockwise from the position shown in FIGS. 3 and 4 for the second molding shot.

Referring now to the drawing and more particularly to FIGS. 1 and 2, a lamp assembly 10 constructed in accordance with the invention comprises a lamp housing 12 and a lens 14 that is secured to the lamp housing 12 by a seal bead 16.

The lamp housing 12 has two side-by-side domes or parabolas each of which has a socket 17 for receiving a lamp bulb (not shown) and serves as a reflector for the lamp bulb that is plugged into the socket associated with it. The lamp housing 12 is molded from a high impact strength thermoplastic material such as polycarbonate, polypropylene and ABS polymers. The lamp housing 12 is preferably colorless and molded of a clear thermoplastic material such as crystal polycarbonate to facilitate the processing of a reflective surface. When such a material is used, the backside of the lamp housing is simply aluminized and coated to provide the necessary reflective surface.

The lens 14 covers the opening of the lamp housing 12, protects the lamp bulbs inside and diffuses the light produced by the lamp bulbs. The lens 14 is usually red or amber and molded of a thermoplastic material such as polycarbonate or acrylic. Acrylic is preferred because the acrylic material is not as expensive as polycarbonate material and because a polycarbonate lens requires a coating for protecting it against the effects of ultraviolet light which adds further to the expense.

The lens 14 is attached to the housing 12 by an annular seal bead 16 which joins the perimeter of the lens 14 to a peripheral flange 18 at the open end of the lamp housing 12. The seal bead 16 may be colorless or it may be black or some other dark color to outline the red or amber colored lens 14. The seal bead 16 is also a thermoplastic material such as polycarbonate or acrylic.

The lamp assembly 10 may also include an optional decorative overlay 19 on the peripheral face of the lens 14. The decorative overlay may be any color and is customarily chosen for its ascetic qualities. Use of the optional decorative overlay 19 usually eliminates the need for coloring the annular seal bead 16. The optional decorative overlay 19 may be of any moldable plastic material that is compatible with the material of the lens 14.

The lamp assembly 10 comprising housing 12 and lens 14 may be molded in a molding machine having first and second matable housing dies and first and second matable lens dies including one lens die that is matable with one of the first and second matable housing dies by a method that may be broadly described as follows. The housing is molded in the housing dies and the lens is molded in the lens dies when the respective dies are mated. The molded housing is retained in the housing die that is matable with the lens die and the molded lens is retained in the lens die that is matable with the housing die. The housing die with the housing retained in it is then mated with the lens die with the lens retained in it. These two dies are configured so that a seal bead cavity is formed at the interface when the two dies are mated. A seal bead is then molded joining the molded housing to the molded lens at the interface of the dies to provide the lamp assembly 10.

Referring now to FIGS. 3 and 4, a rotary transfer molding machine 20 for constructing the lamp assembly 10 is illustrated. The machine comprises an upper platen 22 that moves up and down on guide rods 24 with respect to a lower fixed platen 26. The upper platen 22 carries a turret 28 that rotates by means of an electric indexing motor 30 or the like.

The rotary transfer molding machine 20 has three molding stations that are equally circumferentially spaced 120 degrees apart and that are indicated generally at 32, 34 and 36 in FIG. 3. Molding station 32 has a plastic injection nozzle 38. Molding station 34 has two plastic injection nozzles 40 and 42. Molding station 36 has plastic injection nozzle 44.

The rotary transfer molding machine 20 is equipped with two or three die sets for molding the lamp assembly 10. Two die sets are mandatory. These are a lamp housing die set comprising upper and lower lamp housing dies 46 and 48 and a lens die set comprising upper and lower lens dies 50 and 52. The third die set, the overlay die set comprising upper and lower overlay dies 54 and 56, is optional depending on whether or not the optional overlay 19 is used.

The die sets are originally positioned as shown in FIGS. 3 and 4. That is, the upper and lower housing dies 46 and 48 are located at station 32, the upper and lower lens dies 50 and 52 are located at station 34, and the upper and lower overlay dies 54 and 56 are located at station 34. The upper dies 46, 50 and 54 are mounted on the turret 28 that is carried by the movable upper platen 22 while the lower dies 48, 52 and 56 are mounted on the fixed lower platen 26 as shown in FIG. 4. In this regard it should be noted that the parting line for the housing dies 46 and 48 is substantially lower than the parting lines for the lens dies 50 and 52 and for the overlay dies 54 and 56. The purpose of this lower parting line is explained below. It should also be noted that lower dies 48, 52 and 56 mounted on the fixed lower platen 26 are stationary while the mating upper dies 46, 50 and 54 mounted on the turret 28 of the movable upper platen 22 are both movable for opening and closing the die sets and indexable for realigning the die sets as explained below. This arrangement facilitates injection of several different plastic materials for molding various parts of the lamp assembly. This arrangement also provides a very accurate alignment of the dies when the dies are realigned because the stationary lower dies can be mounted on the fixed lower platen 22 very accurately and then the upper dies can be located in their original positions very accurately off of the stationary dies and then indexed very accurately by the turret 28.

Each die set has two cavities as indicated by the dashed rectangles in FIG. 3. One cavity is for molding a right hand lamp assembly while the other cavity is for molding a left hand lamp assembly. This is customary practice.

FIG. 5A shows the turret 28 positioned as shown in FIGS. 3 and 4 with the die sets located as described above. This is the position for the first shot in the molding process for making the lamp assembly 10. In this first shot, plastic is injected via nozzle 38 into the housing die set comprising upper and lower housing dies 46 and 48 through a hot runner manifold 39, and at the same time plastic is injected via nozzle 40 into the lens die set comprising upper and lower lens dies 50 and 52 through a hot runner manifold 41 as shown in FIGS. 3 and 5B. As indicated earlier, a clear or crystal polycarbonate is preferably injected into the housing die set while at the same time an acrylic plastic is injected into the lens die set. The plastic injections produce right hand and left hand lamp housings and right hand and left hand lens at the same time. However, only one lamp housing 12 and one lens 14 are illustrated in the respective dies in the interests of clarity.

As shown in FIG. 5B, the housing die cavity is valve gated on the flange of the lamp housing 12 to avoid an objectionable appearance of the housing gate on the finished lamp assembly and possible interference with the second shot. On the other hand, the lens die cavity is preferably edge gated on the perimeter for simplicity in manufacture.

Figure 6B:
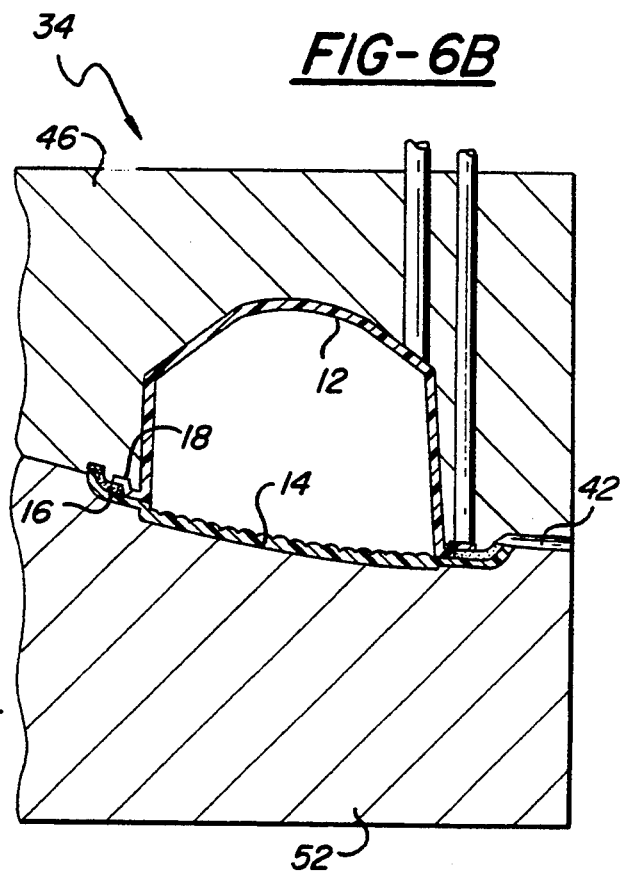
FIG. 6B is a section taken substantially along the line 6B—6B of FIG. 6A looking in the direction of the arrows.
Figure 7A:
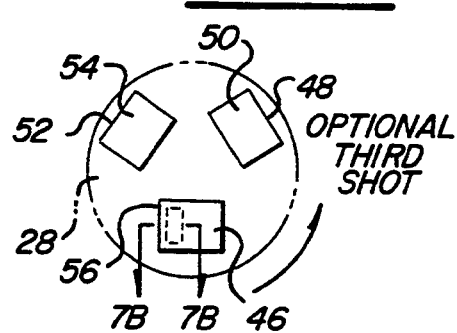
FIG. 7A is a partial top view of the rotary transfer molding machine of FIGS. 3 and 4 showing the turret indexed 240 degrees counterclockwise from the position shown in FIGS. 3 and 4 for the third molding shot.
Figure 7C:
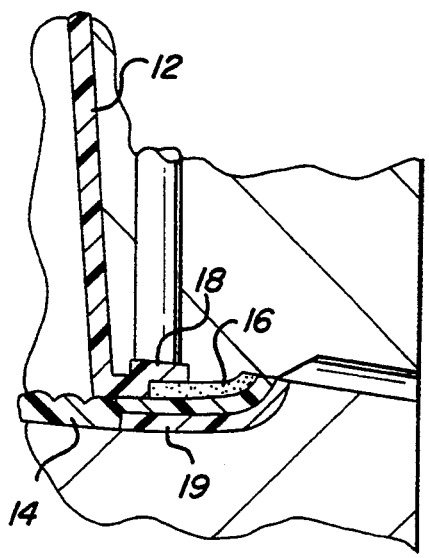
FIG. 7C is an enlargement of a portion of FIG. 7B.
Figure 7B:
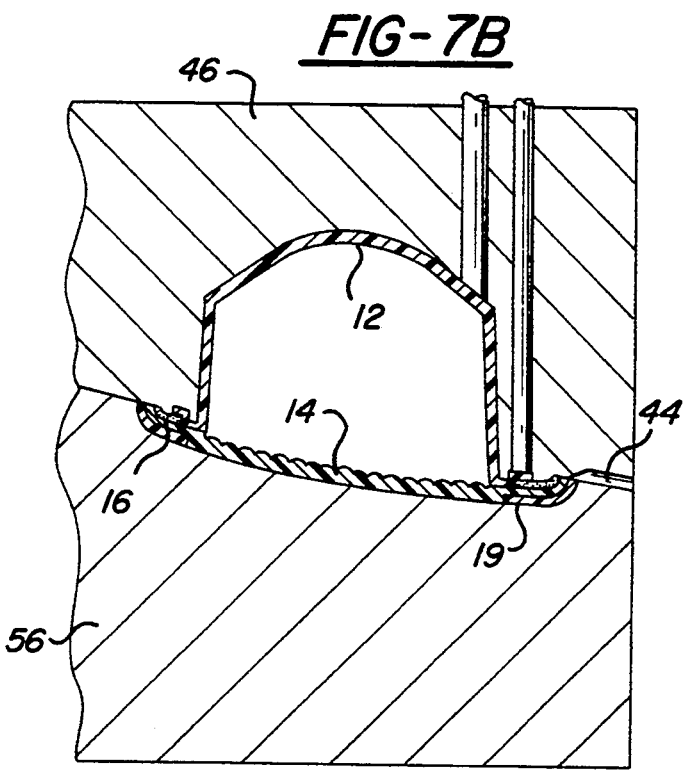
FIG. 7B is a section taken substantially along the line 7B—7B of FIG. 7A looking in the direction of the arrows.

The following should also be noted with regard to the molded lamp housing 12 and molded lens 14. The peripheral flange 18 of the molded lamp housing 12 is shorter than the perimeter of the lens 14 so that its edge is spaced inwardly of the edge of the lens perimeter as shown in FIGS. 6B, 7B and 7C. The peripheral flange 18 is also stepped so that the outer portion is raised and thus spaced from the perimeter of the lens 14 when the two parts are subsequently matched. This stepped configuration of the peripheral flange 18 also locks the lamp housing 12 in the upper housing die 46. This locking feature retains the lamp housing 12 in the upper housing die 46 when the upper housing die 46 is raised and also prevents the wall of the lamp housing 12 from collapsing when the cavity-forming projection 49 of the lower housing die 48 is withdrawn.

It should also be noted that the upper housing die 46 has a second peripheral groove 47 spaced outwardly of the groove that forms the raised part of the peripheral flange 18. The groove 47 is isolated from the molding cavity by the lower housing die 48 during the first molding shot.

It should be further noted that there are not any ribs or bosses on the back side of the parabolic portions of the lamp housing 12 to maximize the effectiveness of the reflective surface that is subsequently applied. Ejector pins in this area are also kept to a minimum as indicated by the single ejector pin 51 in the area and the second ejector pin 53 that acts on the flange 18.

The upper die 50 for molding the lens 14 is equipped with a spring loaded ejector pin 55 which helps keep the molded lens 14 in the lower die 52 when the upper lens die 50 is raised.

After the lamp housing 12 and the lens 14 are molded as shown in FIGS. 5A and 5B, the upper platen is raised with the lamp housing 12 being retained in the upper housing die 46 and the lens 14 being retained in the lower lens die 52. The turret 28 is then indexed 120 degrees counterclockwise from the position shown in FIGS. 3, 4 and 5A to the position shown in FIG. 6A. The upper platen 22 is then lowered so that the upper housing die 46 with the lamp housing 12 retained in it mates with the lower lens die 52 having the lens 14 retained in it at station 34 as shown in FIG. 6B. The machine is now ready for the second molding shot. It should be noted, however, that the upper platen 22 is not lowered all the way to mate the upper housing die 46 with the lower lens die 52 due to the higher parting line of the lens die set as best shown in FIG. 4. This feature protects the cavity forming projection 49 of the lower housing die 48 when it aligns with the upper lens die 50 or the upper overlay die 54 when the turret 28 is indexed for the second and third molding shots.

When the upper housing die 46 and the lower lens die 52 are mated at station 34 as described above, plastic is injected into the space between the peripheral flange 18 of the lamp housing 12 and the perimeter of the lens 14 via nozzle 42. The injected plastic preferably remelts portions of the flange 18 and the marginal portion of the lens 14 adjacent to its perimeter so as to fuse the lamp housing 12 and the lens 14 together when the annular seal bead 16 cools and sets.

The upper platen 22 is raised and the lamp assembly 10 may be removed with the assistance of the ejector pins 51 and 53 in the upper housing die 46 when the seal bead 16 has cooled sufficiently. However, if the optional overlay 19 is desired, the lamp assembly 10 is retained in the upper housing die 46 and the turret 28 is indexed another 120 degrees in the counterclockwise direction to the position shown in FIG. 7A where the upper housing die 46 is located at station 36. The upper platen 22 is then lowered until the upper housing die 56 mates with the lower overlay die 46 as shown in FIG. 7B. Plastic of the desired color is then injected into the die set via nozzle 44 to form the overlay 19. In this regard, it should be noted that the marginal portion of the lens 14 preferably has a depressed face so that the surface of the overlay 19 is contiguous the face of the lens 14 as best shown in FIG. 7C. The upper platen 22 is raised and the lamp assembly 10 may be removed by ejector pins 51 and 53 in the upper housing die 46 when the overlay 19 has cooled sufficiently. After removal, the turret 28 is indexed 120 degrees in the counterclockwise direction to the original starting position and the machine is ready for another cycle when the upper platen 22 is lowered.

While a three station machine has been shown for purposes of illustration, it should be understood that other machine configurations are possible. For instance, a two station machine is not only possible but preferable to reduce cycle time when the optional overlay is omitted.

In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A method of molding a lamp assembly comprising a housing and a lens in a molding machine having first and second matable housing dies and first and second matable lens dies that include one lens die that is matable with one housing die of the first and second matable housing dies comprising the steps of:

molding a housing in the housing dies and molding a lens in the lens dies when the respective dies are mated, retaining the molded housing in the one housing die and retaining the molded lens in the one lens die, mating the one housing die and the one lens die while the molded housing and the molded lens are retained therein, the one housing die and the one lens die being configured so that a seal bead cavity is formed at an interface of the one housing die and the one lens die when so mated, and molding a seal bead that joins the molded housing to the molded lens at the interface of the dies to provide a lamp assembly.

2. The method as defined in claim 1 wherein the seal bead remelts portions of the housing and the lens so as to fuse the lamp housing and the lens together when the seal bead cools and sets.

3. The method as defined in claim 1 wherein the housing is formed with a stepped peripheral flange that has a raised outer portion.

4. The method as defined in claim 1 wherein the lens and the housing are molded of different materials.

5. The method as defined in claim 1 wherein the lens is molded of an acrylic material and the housing is molded of a material selected from the group consisting of polycarbonate, polypropylene and ABS polymers.

6. The method as defined in claim 1 wherein the lens is molded of an acrylic material and the housing is molded of a crystal polycarbonate.

7. The method as defined in claim 1 further comprising the steps of:

retaining the lamp assembly in the one housing die, mating the one housing die with a matable overlay die while the lamp assembly is retained in the one housing die, the one housing die and the overlay die being so that a cavity for molding an overlay on the lens is formed at an interface of the one housing die and the overlay die when so mated, and molding an annular overlay on the lens.

8. A method of molding a lamp assembly comprising a housing and a lens in a molding machine having first and second matable housing dies and first and second matable lens dies that include a second lens die that is matable with a first housing die, and a moveable platen having indexing means for moving and realigning the first dies with respect to the second dies comprising the steps of:

molding a housing of one material in the housing dies and molding a lens of another material in the lens dies, retaining the molded housing in the first housing die and retaining the molded lens in the second lens die, mating the first housing die and the second lens die while the molded housing and the molded lens are retained therein, the first housing die and the second lens die being configured so that a seal cavity is formed at an interface of the first housing die and the second lens die when so mated, and molding a sealant that joins the molded housing to the molded lens at the interface of the dies to provide a lamp assembly.

9. The method as defined in claim 8 wherein the housing is formed with a stepped peripheral flange that has a raised outer portion and the sealant remelts portions of the peripheral flange and the lens so as to fuse the lamp housing and the lens together when the sealant cools and sets.

10. The method as defined in claim 8 wherein the lens is molded of an acrylic material and the housing is molded of a material selected from the group consisting of polycarbonate, polypropylene and ABS polymers.

11. The method as defined in claim 8 wherein the lens is molded of an acrylic material and the housing is molded of a crystal polycarbonate.

12. The method as defined in claim 9 further comprising the steps of:

retaining the lamp assembly in the first housing die, mating the first housing die and a trim die while the lamp assembly is retained in the first housing die, the first housing die and the trim die being configured so that an annular cavity is formed at an interface of the first housing die and the trim die for molding an overlay on the lens when so mated, and molding an annular overlay on the lens.

13. A method of molding a lamp assembly comprising a plastic housing and a plastic lens in a molding machine having first and second matable housing dies and first and second matable lens dies that include one lens die that is matable with one housing die of the first and second matable housing dies comprising the steps of:

molding a lens of colored material having an outer perimeter in the lens dies and molding a housing of translucent material having a stepped peripheral flange that has a raised outer portion and that is shorter than the perimeter of the lens in the housing dies when the respective lens and housing dies are mated, retaining the molded housing in the one housing die and retaining the molded lens in the one lens die, the one housing die having an annular cavity that is spaced outwardly of the peripheral flange of the molded housing, mating the one housing die and the one lens die while the molded housing and the molded lens are retained therein, the one housing die and the one lens die being configured so that an annular seal bead cavity that includes the annular cavity of the one housing die is formed at an interface of the one housing die and the one lens die when so mated, and molding a seal bead that joins the stepped peripheral flange of the molded housing to a marginal portion of the molded lens adjacent the perimeter to provide a lamp assembly.

14. The method as defined in claim 13 wherein the seal bead is molded of a colored material which is of a different color than the colored material of the lens and that remelts portions of the stepped peripheral flange and the marginal portion so as to fuse the lamp housing and the lens together when the seal bead cools and sets.

15. The method as defined in claim 13 further comprising the steps of:

retaining the lamp assembly in the one housing die, mating the one housing die and an overlay die while the lamp assembly is retained in the one housing die, the one housing die and the overlay die being configured so that a cavity for molding an overlay on the lens is formed at an interface of the one housing die and the overlay die when so matched, and molding an annular overlay on the lens.

16. The method as defined in claim 13 wherein the lens is molded of an acrylic material and the housing is molded of a material selected from the group consisting of polycarbonate, polypropylene and ABS polymers.

17. The method as defined in claim 13 wherein the lens is molded of an acrylic material and the housing is molded of a crystal polycarbonate.

18. The method of molding a lamp assembly as defined in claim 1 wherein the remaining housing die and the remaining lens die are spaced apart when the one housing die is mated to the one lens die.

19. The method of molding a lamp assembly as defined in claim 8 wherein the first lens die and the second housing die are spaced apart when the first housing die and the second lens die are mated.

20. The method of molding a lamp assembly as defined in claim 13 wherein the remaining housing die and the remaining lens die are spaced apart when the one housing die and the one lens die are mated.

21. A method of molding a lamp assembly comprising a housing and a lens in a molding machine having first and second matable housing dies and first and second matable lens dies that include a lower lens die that is matable with an upper housing die of the first and second matable housing dies comprising the steps of:

molding a housing in the housing dies and molding a lens in the lens dies when the respective dies are mated, retaining the molded housing in the upper housing die and retaining the molded lens in the lower lens die, mating the upper housing die and the lower lens die while the molded housing and the molded lens are retained therein, the upper housing die and the lower lens die being configured so that a seal bead cavity is formed at an interface of the upper housing die and the lower lens die when so mated, and molding a seal bead that joins the molded housing to the molded lens at the interface of the dies to provide a lamp assembly.

* * * * *